United States Patent [19]

Ozaki et al.

[11] Patent Number: 5,501,605
[45] Date of Patent: Mar. 26, 1996

[54] WIRING HARNESS ASSEMBLY FOR VEHICLES

[75] Inventors: Keiichi Ozaki, Kosai; Sanae Kato, Gotenba; Yoshimi Masuda, Shizuoka, all of Japan

[73] Assignee: Yazaki Corporation, Tokyo, Japan

[21] Appl. No.: 249,198

[22] Filed: May 26, 1994

[30] Foreign Application Priority Data

Jun. 7, 1993 [JP] Japan ................................. 5-135658
Jun. 7, 1993 [JP] Japan ................................. 5-135659

[51] Int. Cl.⁶ ........................................... H01R 9/09
[52] U.S. Cl. ........................... 439/34; 174/72 A; 439/45; 439/76.1; 439/404; 439/724
[58] Field of Search ......................... 29/850, 830; 439/34, 439/45, 74, 76, 511, 404, 724; 174/72 A, 72 TR

[56] References Cited

U.S. PATENT DOCUMENTS

| | | | |
|---|---|---|---|
| 3,915,544 | 10/1975 | Yurtin | 439/77 X |
| 4,000,558 | 1/1977 | Cahill | 29/850 |
| 4,065,199 | 12/1977 | Andre et al. | 339/17 |
| 4,674,819 | 6/1987 | Fujitani et al. | 439/404 X |
| 4,715,822 | 12/1987 | Stribel | 439/74 |
| 4,778,393 | 10/1988 | Hosogai et al. | 439/45 |
| 4,781,600 | 11/1988 | Sugiyama et al. | 439/45 |
| 4,818,236 | 4/1989 | Nakayama et al. | 439/34 |
| 4,918,261 | 4/1990 | Takahashi et al. | 174/72 A |
| 5,040,996 | 8/1991 | Kobold | 439/76 |

FOREIGN PATENT DOCUMENTS

| | | |
|---|---|---|
| 2517767 | 10/1976 | Germany . |
| 3531593A1 | 3/1986 | Germany . |
| 3534653A1 | 4/1986 | Germany . |
| 8703611.8 | 11/1987 | Germany . |
| 5217614 | 8/1993 | Japan ................. 439/34 |
| 2166603 | 5/1986 | United Kingdom ......... 439/34 |
| WO90/06609 | 6/1990 | WIPO . |

OTHER PUBLICATIONS

Elektronik Industrie 2—1984, Schneid–Klemm–Verbindungen in der Nachrichtentechnik.
German Office Action dated Dec. 6, 1994 (with translation).

*Primary Examiner*—William G. Briggs
*Attorney, Agent, or Firm*—Armstrong, Westerman, Hattori, McLeland & Naughton

[57] ABSTRACT

The present invention provides a connecting configuration in wiring harness assembly or in a junction box used in the wiring harness assembly, wherein a plurality of individual primary wires and branch wires branched therefrom to form sub wiring harnesses are connected to each other per predetermined circuits by connecting means by way of electrically insulating members each made of a sheet or a thin plate covering the joint portions therebetween, which insulating members being piled up in one-on-another form, so that the entire wire connecting configuration can be accommodated in one casing or one box. Since the connecting configuration according to the present invention is constructed as such, minimization, weight saving and integration of a wiring harness assembly or a junction box used therein are all enabled, and alterations including replacement of or addition to the circuits are readily performed. Moreover, since the folded and accommodated branch wires can be readily taken out from the casing or the junction box and the insulating members can be easily checked individually, the maintenance thereof is facilitated in great deal.

6 Claims, 9 Drawing Sheets

WIRING HARNESS ASSEMBLY FOR VEHICLES

BACKGROUND OF THE INVENTION

1. Field of the Invention

The present invention relates to an improvement in a connecting configuration of wiring harness assembly for use in wiring distribution within vehicles and also relates to a junction box for interconnection of a plurality of wiring harnesses.

2. Description of the Invention

Wiring harness assemblies conventionally adopted heretofore have been configured such that a plurality of branch wires are connected to a primary wire. However, in recent years there has been a tendency to increase the number of electric circuits including relays and fuses in proportion to an increase in the number of various gadgets required due to the driver's tendency to pursue efficiency of comfortability, safety etc. with respect to vehicles. Under the circumstance above, the fact that a wiring harness assembly is likely to grow larger and complicated can not be avoided in a conventional wiring configuration in which a plurality of branch wires are branched from a primary wire, whereby not only substantial time and energy are consumed for production thereof but it has also been made impossible to perform sufficient maintenance including checking and repairing specially in such a case as disconnection of wires or the like.

In order to avoid such problems, there has been disclosed a wiring configuration as shown in Japanese Utility Model Application No. 51-69776 in which various multi-junctions are connected to a primary wire at various parts thereon. However, since many of such multi-junctions are required in accordance with the increase in the number of branch wires to be connected to the primary wire, the tendency of wiring harness assembly to grow larger and complicated can not be avoided even by this method.

Apart from this, there has also been disclosed a wiring configuration as shown in Japanese Patent Application No. 55-46206, wherein a primary wire bundle is provided with a plurality of connector boxes, so that a plurality of branch wires are branched therefrom by coupling the respective connectors thereof to each of the connector boxes. However, since connector boxes have to be prepared as additional components in this configuration, the wiring harness assembly as a whole can be enlarged and made complicated, so that production cost thereof is also raised.

Furthermore, as shown in Japanese Patent Application No. 58-176808, there has been provided a wiring configuration in which a plurality of wiring harnesses each provided with connectors at the opposite ends thereof are aligned in parallel and fixed to each other at a fixing section thereof to form a wiring harness assembly. However, even though this assembly is aligned in an orderly way, as no means for interconnecting respective wiring harnesses is shown therein, no method can be taken for providing so-called branch wires from the primary wire bundle, so that a variety of circuit configurations cannot be established.

Apart form these configurations above, there has also been provided an electrical junction box from another point of view for avoiding the phenomenon that a wiring harness assembly is likely to grow larger and complicated as disclosed in Japanese Patent Application No. 2-219413, wherein a plurality of divided wire distribution cases are piled up on one-on-another mode, on each of which primary bars and sub wires are connected to each other, wherein primary bars on the piled distribution cases are interconnected by way of a connecting unit so as to electrically connect the predetermined sub wires to form an entire circuit as a whole. However, even in the junction box as constructed above, since primary bars and a connecting unit for interconnecting the primary bars are adopted therein, substantial number of additional components are required apart from the distribution cases themselves, and the number of joint portions therebetween is also incremented, whereby perfect checking of each of the joint portions is likely to be neglected, and thus operability therearound is deteriorated and reliability thereof is also lowered accordingly.

SUMMARY OF THE INVENTION

The present invention has been made to eliminate such problems as described above, and it is a first object of the present invention to provide an improved connecting configuration of wiring harness assembly formed by numerous wires, wherein alterations including addition and replacement of the circuit are easily performed, so that high integration, weight saving of wiring and simplification of production procedure are all enabled, and it is a second object of the present invention to provide an improved connecting configuration in a junction box to be included in a wiring harness assembly, which is capable of reducing the number of components at the joint portions of sub wires branched from primary wires, minimizing the size of an entire box by accommodating the sub wires therein efficiently, thereby enabling high integration of wire distribution and facilitating the maintenance thereof.

In order to achieve the above first object, a connecting configuration of wiring harness assembly according to the present invention is constructed such that the primary wire bundle and branch wires branched therefrom to form sub wiring harnesses are connected to each other per predetermined circuits by way of electrically insulating members each made of a sheet or a thin plate, which insulating members being piled up in one-on-another form, so that the entire wiring harness assembly is accommodated in one casing.

On the other hand, in order to achieve the above second object, a connecting configuration in a junction box according to the present invention is constructed such that a wire distribution board provided with a plurality of circuit conductors is accommodated in one box, wherein primary wires electrically connected to the circuit conductors and sub wires which are branched from the primary wires and collected per branch circuits are joined to each other by way of electrically insulating members each made of a sheet or a thin plate and by folding the primary wires, these insulating members are piled one on another to be accommodated all in one box by folding the primary wires.

With a connecting configuration according to the first aspect of the present invention, since the joint portions between the primary wire bundle and branch wires branched therefrom are piled to be accommodated in one casing together with electrically insulating members such as a sheet or a thin plate, the wiring harness assembly as a whole can be made more integrated and lighter in weight. Further, since the connection between the primary wire bundle and the branch wires is made by way of the insulating sheet or thin plate, the joint portions can be disposed in a matrix mode and thus an easy connection of a branch wire to an arbitrary one of the primary wire bundle can be enabled, so that alterations including replacement of or addition to the existing circuits are readily performed. Further, since the joint portions of the branch wires which are branched from the primary wire bundle and constructing sub wiring harnesses are disposed in a two-dimensional way, an automatization of the production thereof can also be realized to improve the productivity.

On the other hand, with a connecting configuration according to the second aspect of the present invention, since the subwires collected per branch circuits are joined to the primary wires by way of electrically insulating members each made of a sheet or a thin plate, not only the joint portions therebetween are all protected by the insulating members respectively, but by folding the primary wires the subwires branched therefrom and collected per branch circuits are also piled up together with the insulating members, whereby many subwires can be efficiently accommodated in one box, so that minimization, weight saving and integration of the junction box are all enabled. Moreover, since the folded and accommodated subwires can be readily taken out from the box and the insulating members can be easily checked individually, the maintenance thereof is facilitated in great deal.

The above and other objects, features and advantages of the invention will become apparent from the following description and the appended claims, taken in conjunction with accompanying drawings which show by way of preferred embodiments of the invention.

DESCRIPTION OF THE PREFERRED EMBODIMENTS

In the following, several embodiments of the present invention are described with reference to the accompanying drawings.

Figure 1:
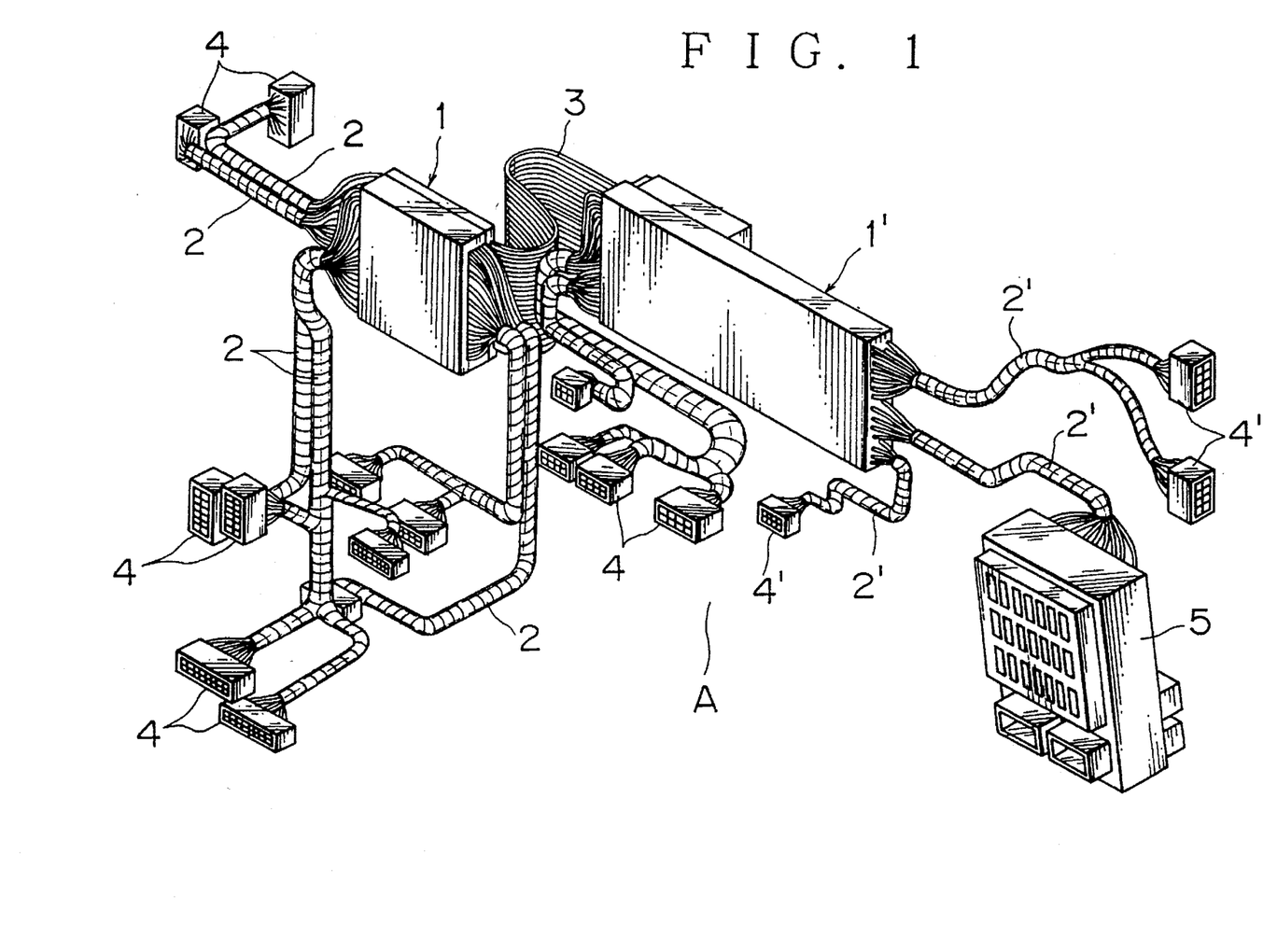
FIG. 1 is a perspective view of a wiring harness assembly for vehicles as an example of the present invention.
Figure 2:
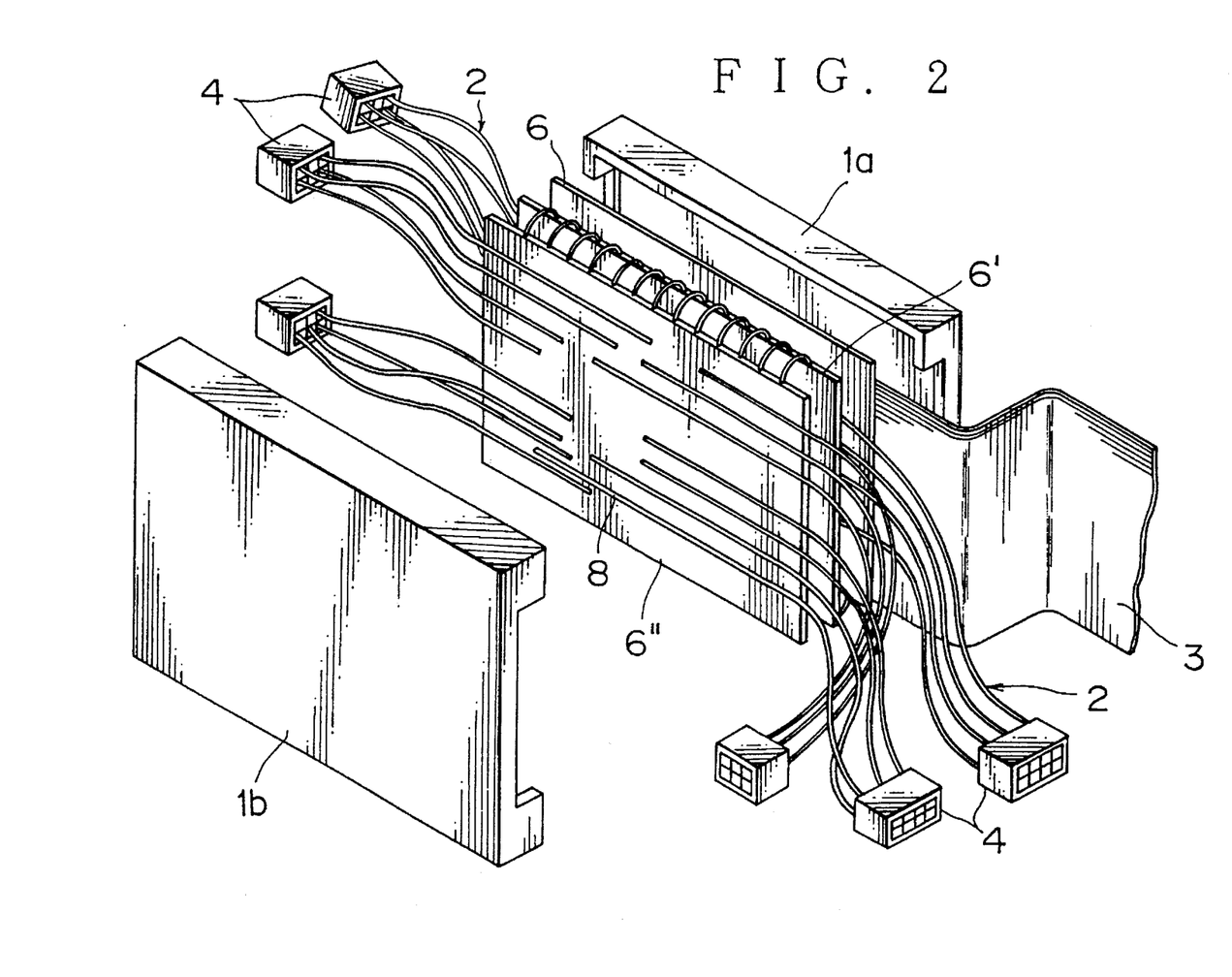
FIG. 2 is a perspective view showing insulating sheets and joint portions of the branch wires branched from the primary wire bundle both accommodated in the casing of FIG. 1.

FIG. 1 is an illustration showing a perspective view of a wiring harness assembly A for vehicles as an embodiment of the connecting configuration according to the first aspect of the present invention, and in the figure the wiring harness assembly A is composed of a plurality of sub wiring harnesses 2, 2' which are branched from the primary wire bundle in the casings 1 and 1' and a wiring harness 3 between these casings, wherein connectors 4, 4' and a junction box 5 are connected respectively to the end portions of the sub wiring harnesses 2 and 2'. It is to be noted that since the casings 1 and 1' are almost similar in the structure thereof, explained hereinafter is only about casing 1. The casing 1 is formed by molding an insulating synthetic resin material, and is composed of an upper sub-casing 1a and lower sub-casing 1b both made of a thin box which are separable in the lateral direction. Within the casing 1, the joint portions of the sub wiring harness 2 which is branched from the primary wire bundle are accommodated in a piled state together with insulating sheets 6, 6' and 6" by folding the primary wire bundle 7 (shown in FIG. 3).

Figure 3:
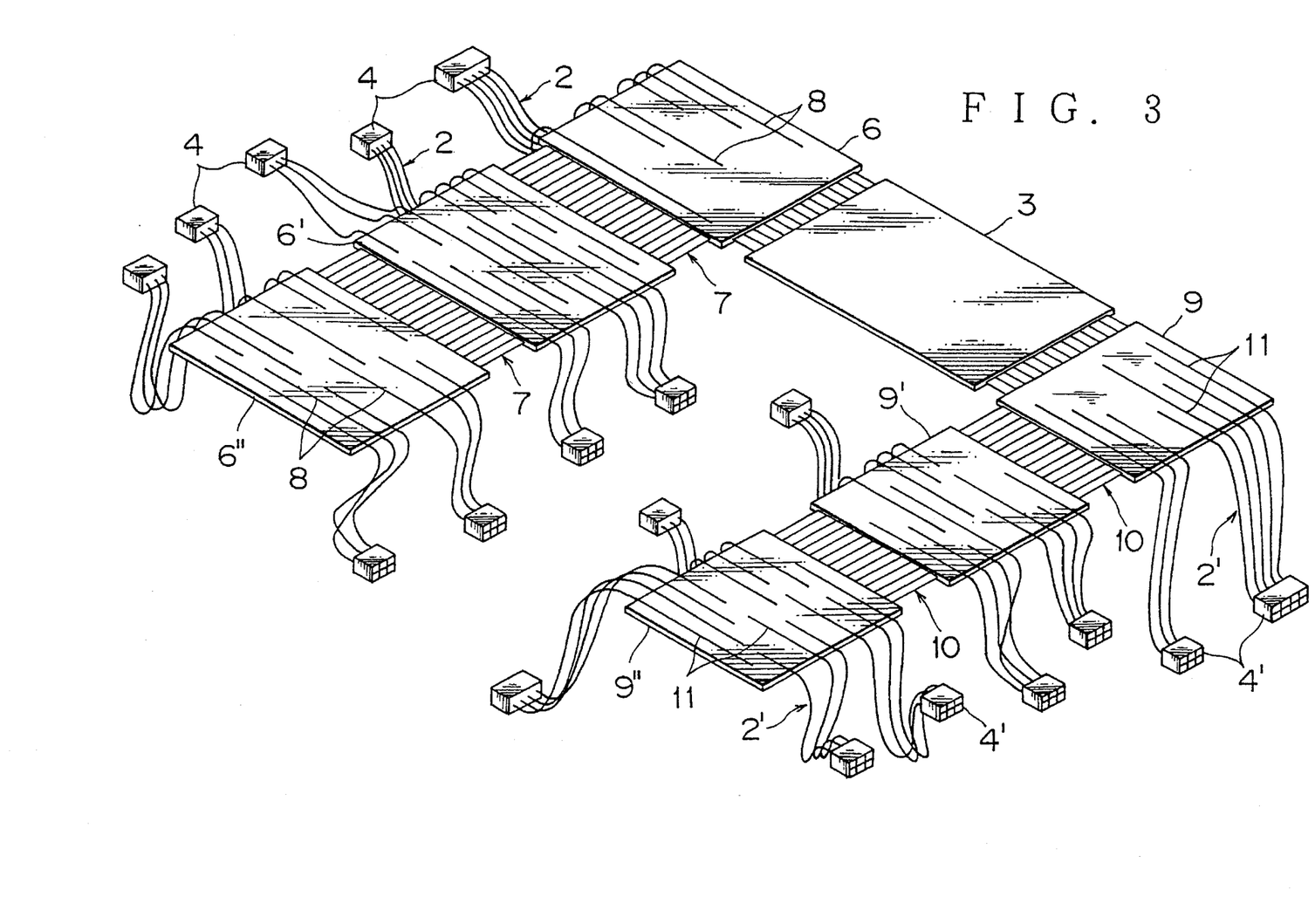
FIG. 3 is an exploded perspective view of the insulating sheets and primary wire bundles unfolded.

FIG. 3 shows an exploded view showing the state that the folded primary wire bundle 7 is unfolded, in which with respect to the primary wire bundle 7 aligned in parallel a plurality of branch wires 8 composing the sub wiring harness 2 are joined by way of the insulating sheets 6, 6' 6" per predetermined circuits. By the way, a predetermined circuit can be a sub wiring harness of only one circuit, or can be a plurality of sub wiring harnesses bundled to one circuit.

On the other hand, also in the casing 1' branch wires 11 are connected to the primary wire bundle 10 by way of insulating sheets 9, 9' and 9", and the connection between the primary wire bundle 7 and the other primary wire 10 is performed by a wiring harness 3.

Figure 4:
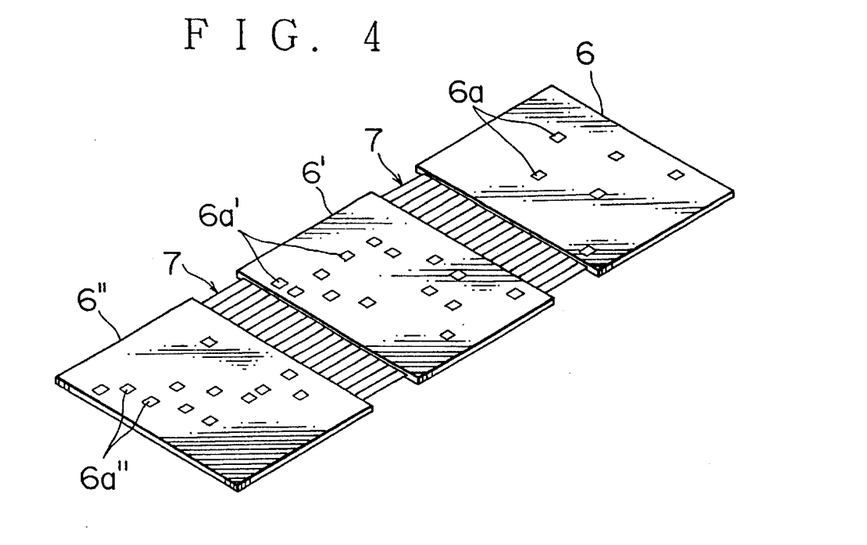
FIG. 4 is a perspective view showing the state that the insulating sheets are provided on the primary wire bundle of FIG. 3.
Figure 5:
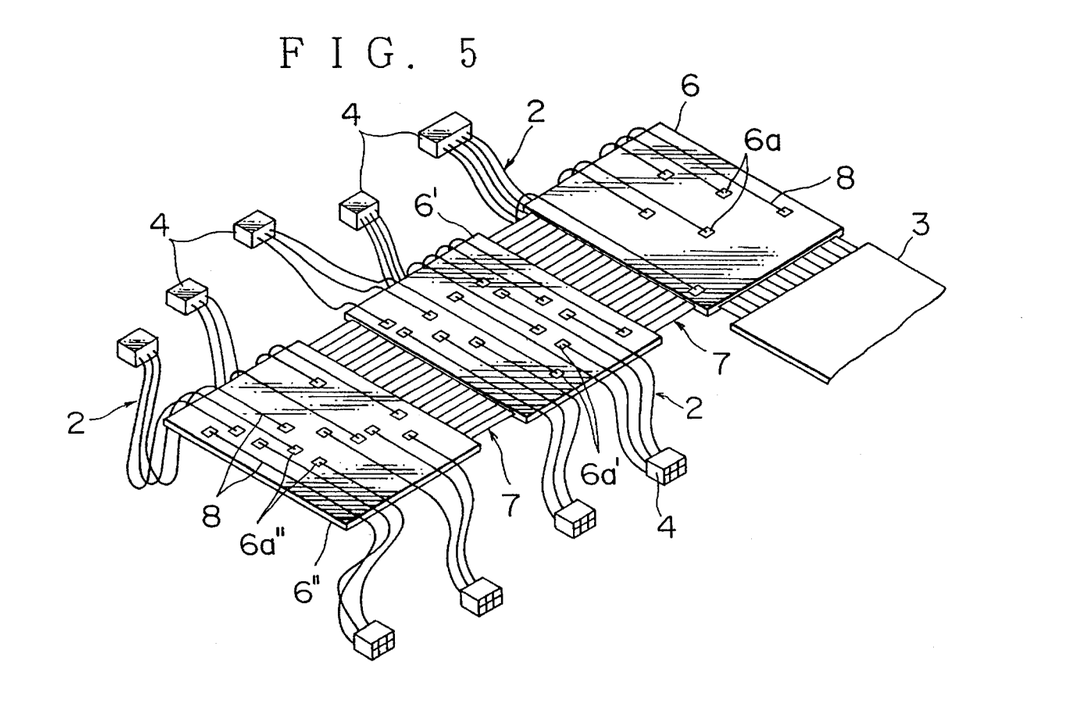
FIG. 5 is a perspective view showing the state that the branch wires forming sub wiring harness are connected to the primary wire bundle by way of the insulating sheets of FIG. 4.
Figure 6:
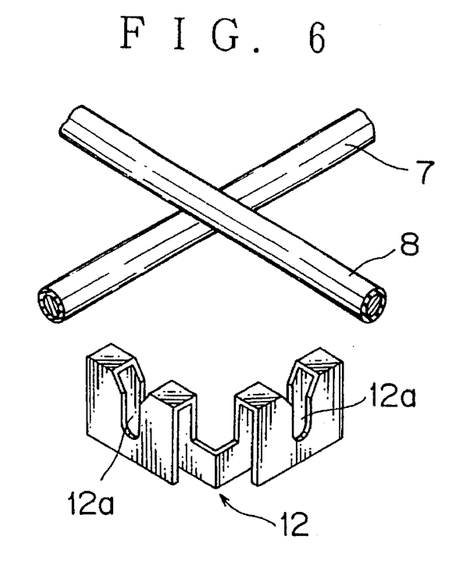
FIG. 6 is a pressure-welding type connector used for the connection between a wire in the primary wire bundle and one of the branch wires of FIG. 5.
Figure 7:
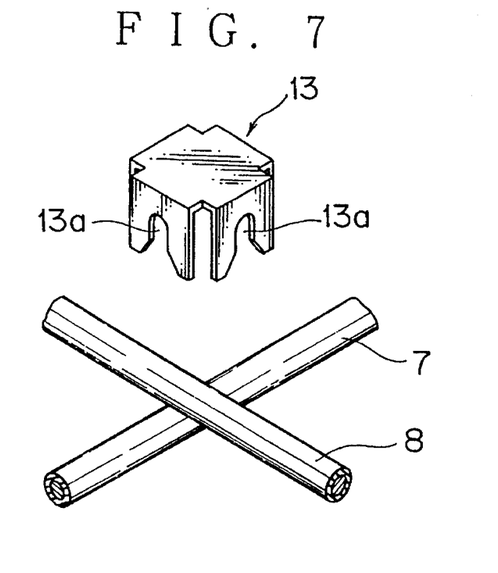
FIG. 7 is another pressure-welding type connector used for the connection between one in the primary wire bundle and one of the branch wires of FIG. 5.

For connecting the primary wire bundle 7 and the branch wires 8 (also in the case of primary wire bundle 10 and branch wires 11), the insulating sheets 6, 6' and 6" are first disposed on the primary wire bundle 7 aligned in parallel as shown in FIG. 4, and thereafter cavities 6a, 6a' and 6a" are formed at predetermined positions. Then, as shown in FIG. 5, branch wires 8 are placed on the primary wire bundle 7 substantially at a right angle to the sheets 6, 6', 6", the end portions of each of the branch wires 8 are threaded into the cavities 6a, 6a', 6a", then as shown in FIGS. 6 and 7, one of the primary wire bundle 7 and a corresponding one of branch wires 8 are placed on pressure-welding terminals 12, 13 to be pressed against the pressure-welding slots 12a, 13a for interconnection thereof. It is to be noted that other terminals such as pressing metal and so on can also be used for their interconnection, and also to be noted that even ultra-sonic wave, heat welding method or the like can be used for their eternal interconnection thereof without using the above pressure-welding terminals. After the interconnection between the primary wire bundle 7 and branch wires 8 by the above methods, the primary wire bundle 7 is folded at the positions between the sheets 6 and 6' and also between 6' and 6", so that these sheets are piled one on another to be accommodated in the casing 1.

In the above embodiment, the case that the three insulating sheets are accommodated in the casing 1 is explained, it is to be noted that the number of insulating sheets to be used can be easily reduced or increased at the user's will, and that the number of casings to be used should not necessarily be only two, but can be reduced or increased depending on the circuit configuration to form a desired wiring harness assembly. Besides, what is explained in the above embodiment is the case that primary wire bundle 7 composed of a plurality of wires aligned in parallel is interposed by having sheets 6 thereon. However, the structure of the primary wire bundle is not limited to the above construction, and in fact flat wires, flexible flat circuits and so on can be adopted instead, wherein when using these latter materials, there is no need for interposing any extra-components like the above insulating sheets since the insulating cover of themselves can be used instead. In this case above, what should be done is only peeling the insulating cover thereof at their joint portions to expose at the position in which they are connected with the predetermined branch wires of the sub wiring harness for accommodating in the casing.

The explanation heretofore is regarding an improvement in the connecting configuration of interconnection of wiring harnesses in a wiring harness assembly, whereby integration and weight saving of a wiring harness assembly and also easy alteration of the circuits therein are enabled, so that an adaptability with respect to various types of circuit construction can be also enabled, which was not possible in the conventionally used wiring configurations.

On the other hand, several embodiments of the present invention according to the second aspect are described with reference to the accompanying drawings.

Figure 8:
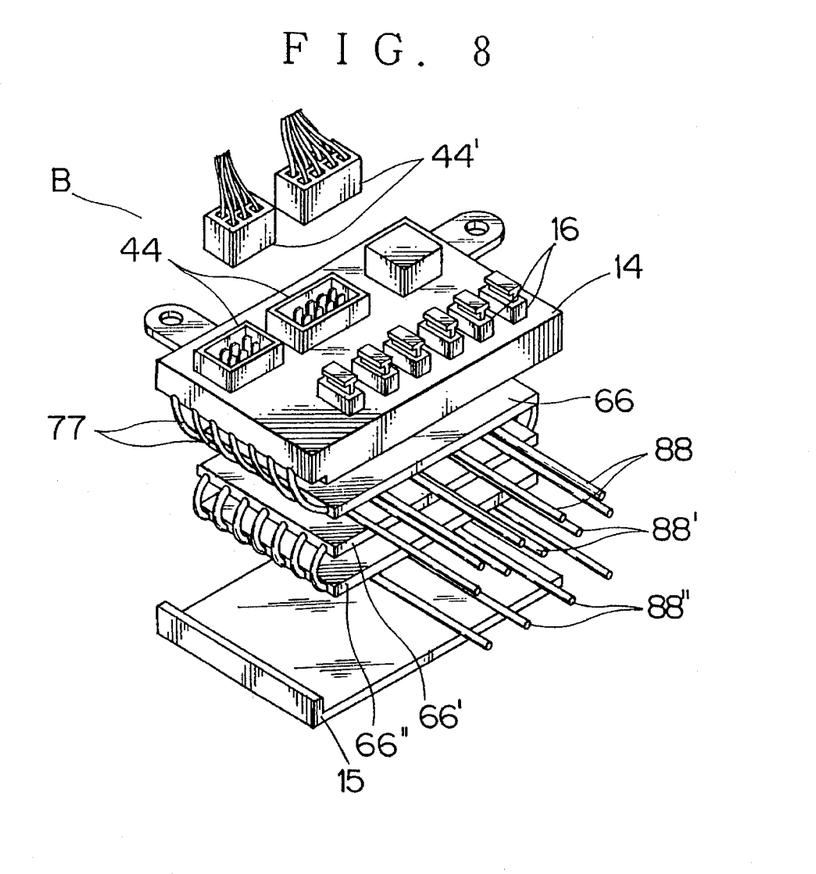
FIG. 8 is an exploded perspective view of a junction box according to the second aspect of the present invention wherein the upper cover and the bottom plate thereof are separated.

FIG. 8 is an exploded view of the junction box B with a connecting configuration according to the second aspect of the present invention wherein the upper cover 14 and the bottom plate 15 are separated in order to show the primary wires and subwires branched therefrom. The junction box B is composed of an upper cover 14 and a bottom plate 15, wherein the primary wires 77 are folded into the bottom plate 15 to be accommodated therein as explained hereinafter.

Figure 9:
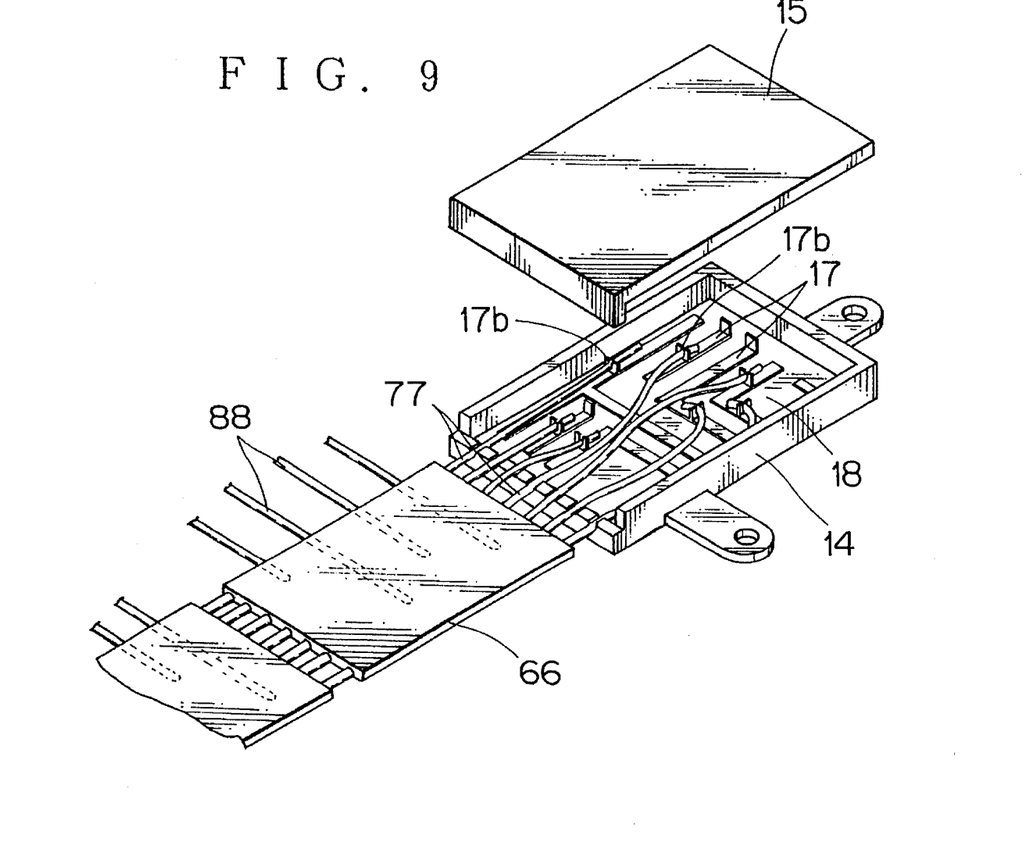
FIG. 9 is a perspective view in which inner components of the upper cover of FIG. 8 is shown from the rear side thereof.
Figure 10:
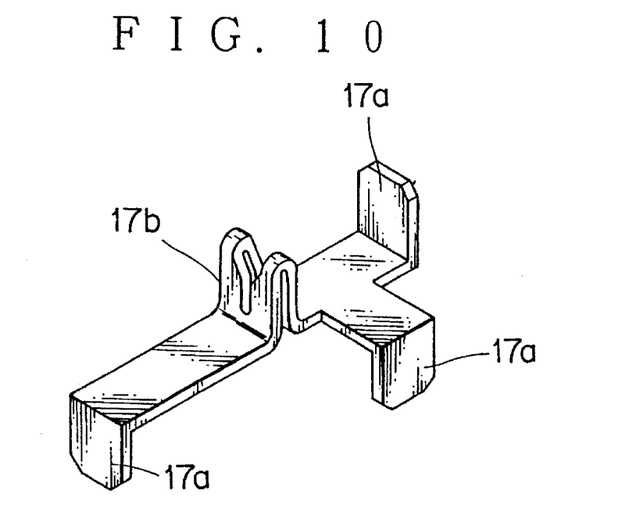
FIG. 10 is a perspective view showing the circuit conductor of FIG. 9.

Disposed on the upper cover 14 are electric devices such as connectors 44 and fuse cavities 16, and reference numeral 44' denotes other connectors to be mated with these connectors 44, whereas disposed inside the upper cover 14 is, as shown in FIG. 9, a wire distribution board 18 provided with a plurality of bus-bars 17 as circuit conductors, whereby a circuit which is electrically conductable with such electric devices as the connectors 44 and fuse cavities 16 is constructed therein. Each of the bus-bars 17 is formed, as shown in FIG. 10, of an electrically conductive metal plate, wherein it is provided with tub-like electrically contact sections 17a folded substantially perpendicular to the respective end portions thereof, and a plurality of primary wires 77 connected with the pressure-welding terminal section 17b thereof are drawn out from the upper cover 14 in a parallel relation.

Figure 11:
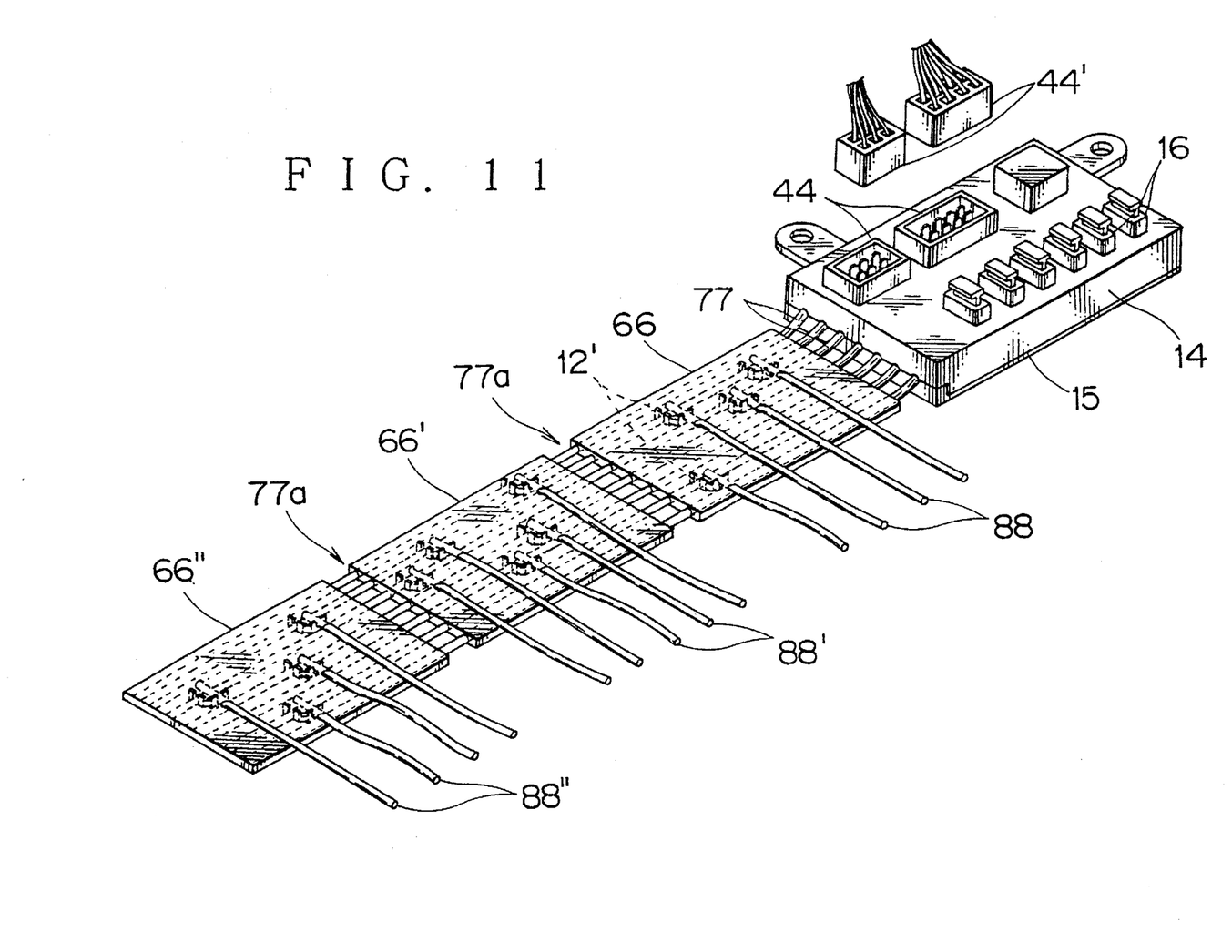
FIG. 11 is a perspective view showing the state in that the subwires are connected to the primary wires of FIG. 9.

FIG. 11 shows the state that the primary wires 77 are extended in a linear-like form, wherein subwires 88, 88', 88" (hereinafter referred to just as 88s) each of which is collected per one connecting unit as a branch circuit composing a sub wiring harness are connected to the primary wires 77 at predetermined intervals. At the joint portions between the primary wires 77 and the subwires 88s, insulating sheets 66, 66', 66" (hereinafter referred to just as 66s) are interposed in relation to the collected subwires 88s, so that corresponding subwires are connected to the primary wires 77 threading through the insulating sheets 66s. By the way, the sheet 66 is made of a flexible electrically insulating synthetic resin film, and is cut up so that it can be also accommodated within the bottom plate 15. It is to be noted that the sheet can also be replaced by a synthetic resin thin plate instead.

Figure 12:
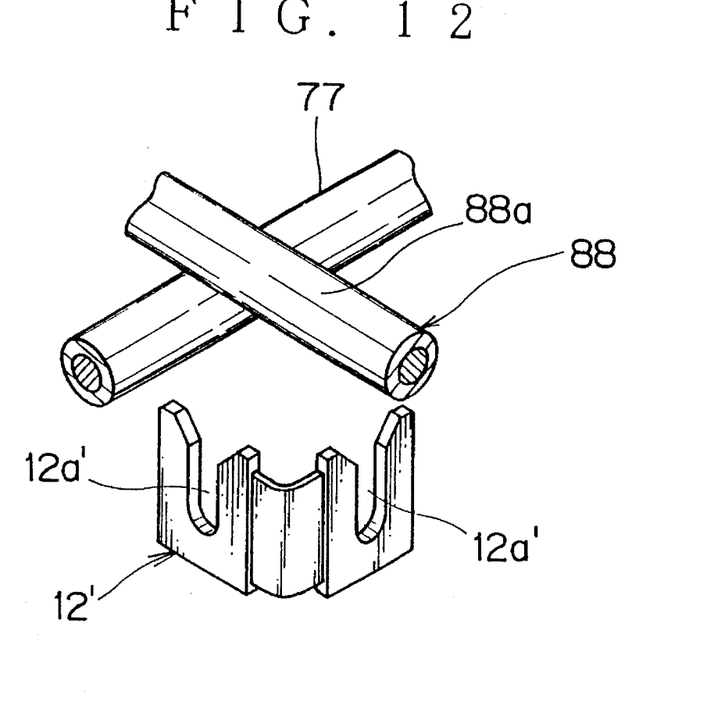
FIGS. 12 and 13 are pressure-welding type connectors used for the connection of the primary wire and the subwire of FIG. 11.
Figure 13:
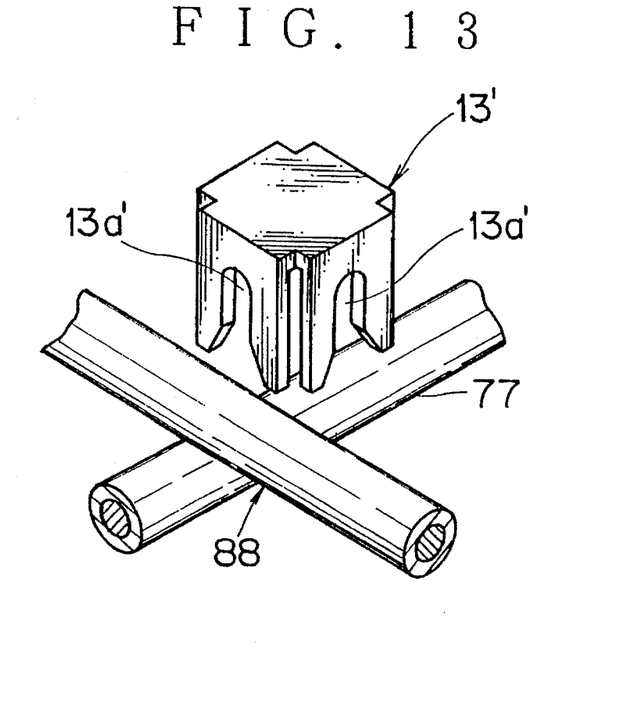

The connection between the primary wires 77 and the subwires 88 is performed, as shown in FIGS. 12 and 13, just like the connection between the primary wire bundle 7 and the branch wires 8 in the first aspect of the present invention (FIGS. 6 and 7) by use of pressure-welding terminals 12' and 13', wherein the end portions 88a of the subwires 88 and the primary wires 77 threaded into the sheet 66 are respectively pressed onto the pressure-welding slots 12a' and 13a'. Apart from this, the connection can be also executed by a pressure metal, or by an ultrasonic wave welding method and so on just like the case of the improvement in the configuration of interconnection of wiring harnesses in a wiring harness assembly as mentioned according to the first aspect of the present invention. In the above connecting configuration of the junction box, there is formed a space between adjacent sheets 66 and 66' or 66' and 66" to form bending portions 77a of the respective primary wires 77. By bending the primary wires 77 at the bending portions 77a thereof, the primary wires 77 are folded, as shown in FIG. 8, per each sheet (66, 66', 66") to be accommodated in the bottom plate 15, and by drawing the collected and aligned subwires 88s outside the bottom plate 15 to the contrary and adding some connectors to the branch circuits on request, a sub wiring harness can be constructed.

In the above embodiment, although three branch circuits, seven primary wires, four or five subwires are shown in the corresponding figures, they can be increased or reduced as occasion demands.

Figure 14:
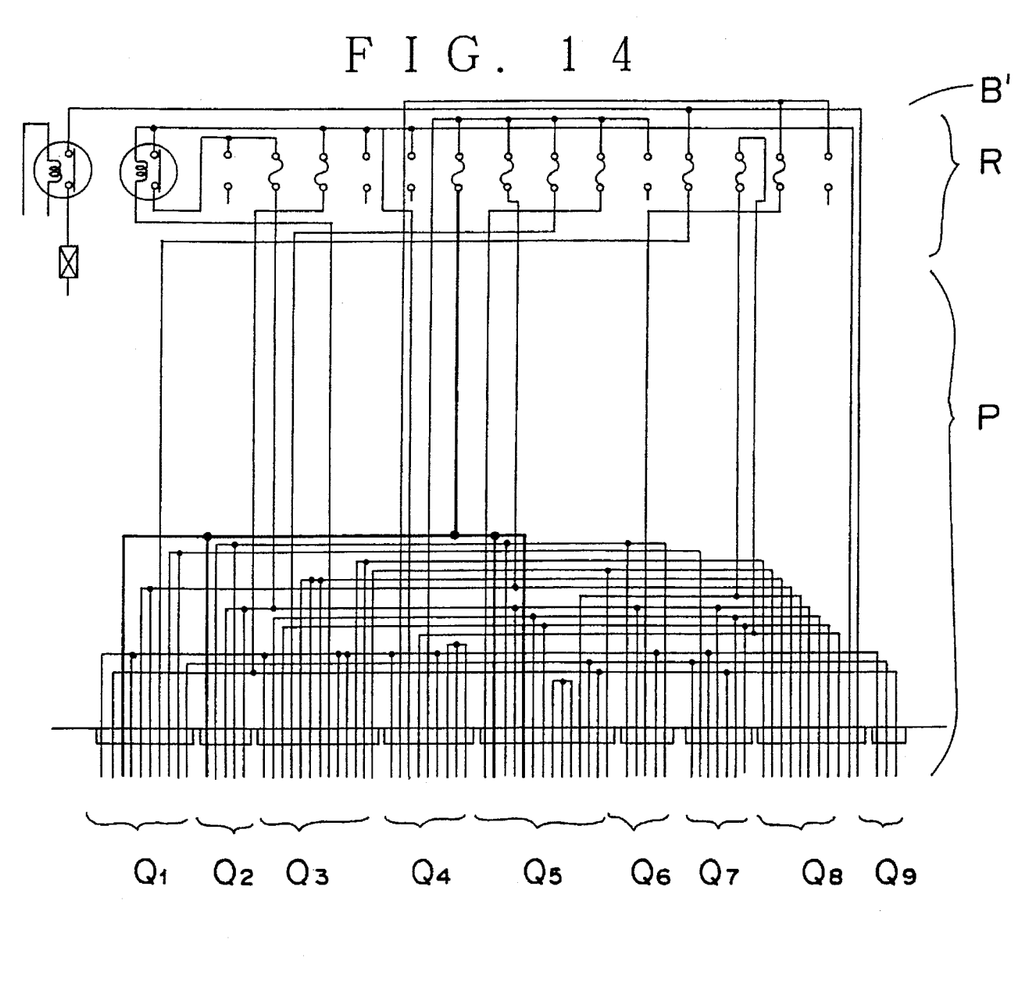
FIG. 14 is an example of wire distribution according to another embodiment of the second aspect of the present invention.

FIG. 14 shows a connecting configuration of a junction box B as another embodiment of the second aspect of the present invention, wherein both primary wires and subwires are increased more than the first embodiment above. In the figure, P denotes primary wires and are accommodated within the junction box together with the circuit conductor portion R, whereas Q1 to Q9 denote branch circuits respectively and are group of subwires which are branched from the primary wires P and drawn outside the case to configure a sub wiring harness.

EFFECT OF THE INVENTION

With a connecting configuration according to the first aspect of the present invention, since joint portions of the branch wires which are branched from the primary wire bundle and collected to be a sub wiring harness are piled one on another to be accommodated in a casing together with the insulating sheets or the like, integration and weight saving of a wiring harness assembly and also easy alteration of the circuits therein are enabled, so that adaptability with respect to various types of circuit configuration can also be enabled. Further, since the joint portions can be easily taken out from the casing, checking or maintenance thereof can be facilitated in great deal. In addition, since the joint portions of the branch wires composing a sub wiring harness are disposed in a two-dimensional form, an automatization of the connecting operation is also substantially facilitated, so that the productivity thereof can be improved as well.

On the other hand, with a connecting configuration according to the second aspect of the present invention, since an insulating sheet or a thin plate is interposed in the joint portions between the primary wires connected to the circuit conductor and the subwires branched therefrom within the box, the joint portions are securely protected and also as the insulating sheet or a thin plate can be piled one on another by folding the primary wires, a plurality of subwires can be efficiently accommodated within the junction box, so that minimization, weight saving and high integration of the junction box can be enabled. Further, due to the fact that groups of subwires accommodated within the junction box can be readily drawn out therefrom to check them per individual insulating sheets, maintenance including reparation and so on can be substantially facilitated.

Although the invention has been described in its preferred form with a certain degree of particularity, obviously many changes and variations are possible therein. It is therefore to be understood that the invention may be practiced otherwise than as specifically described herein without departing from the spirit and scope thereof.

What is claimed is:

1. A wiring harness assembly which includes a plurality of interconnected wiring harnesses, said wiring harness assembly comprising:

a primary wire bundle formed by a plurality of primary wires, said primary wire bundle being foldable such that a first portion of said primary wire bundle overlies a second portion of said primary wire bundle;

insulating means adjacent to and generally coextensive with said first portion of said primary wire bundle, said insulating means having a plurality of openings therethrough for communication with said plurality of primary wires;

a plurality of branch wires which respectively branch from ones of said plurality of primary wires, each of said plurality of branch wires extending through respective ones of said plurality of openings in said insulating means, and said branch wires being gathered at a distance from said insulating means to form a sub-wiring harness;

connecting means for interconnecting respective ones of said plurality of wires in said primary wire bundle with respective ones of said plurality of branch wires;

said insulating means being interposed between said first portion of said primary wire bundle and said second portion of said primary wire bundle in the folded construction, and said insulating means covering said connecting means, wherein said primary wire bundle, said insulating means, and said plurality of branch wires can be housed in one casing through folding of said primary wire bundle.

2. A wiring harness assembly as claimed in claim 1, wherein said insulating means is a synthetic resin sheet.

3. A junction box in combination with a wiring harness assembly composed of a plurality of wiring harnesses, the junction box including a housing and a wire distribution board provided with a plurality of circuit conductors, comprising:

a plurality of individual primary wires respectively connected to ones of said plurality of circuit conductors;

a plurality of sub-wires which branch from respective ones of said plurality of individual primary wires, said sub-wires being gathered at a distance from said insulating means to form branch circuits;

a connecting means for respectively interconnecting ones of said plurality of individual primary wires and respective ones of said plurality of subwires;

insulating means interposed between said plurality of primary wires and said plurality of sub-wires for covering said connecting means, said insulating means having a plurality of openings therethrough respectively receiving each of said plurality of sub-wires therein, wherein said plurality of individual primary wires, said plurality of sub-wires, and said insulating means can be housed in one housing through folding of said plurality of individual primary wires into an overlying relationship.

4. A junction box as claimed in claim 3, wherein said insulating means is a synthetic resin sheet.

5. A junction box as claimed in claim 1, wherein said primary wire bundle is folded more than once, wherein additional insulating means are provided such that there is at least one insulating means for each fold, and wherein each said insulating means is a synthetic resin sheet.

6. A junction box as claimed in claim 3, wherein said plurality of individual primary wires are folded more than once, wherein additional insulating means are provided such that there is at least one insulating means for each fold, and wherein each said insulating means is a synthetic resin sheet.

* * * * *